(12) United States Patent  (10) Patent No.: US 9,118,849 B1
Hilde  (45) Date of Patent: Aug. 25, 2015

(54) TWO SOURCE ACTIVE SENSOR SYSTEM FOR THREE-DIMENSIONAL VISION

(71) Applicant: The United States of America as Represented by the Secretary of the Navy, Washington, DC (US)

(72) Inventor: Jeffrey Jay Hilde, Onyx, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 13/942,284

(22) Filed: Jul. 15, 2013

Related U.S. Application Data

(60) Provisional application No. 61/671,407, filed on Jul. 13, 2012.

(51) Int. Cl.
*H04N 5/33* (2006.01)
*H01Q 3/00* (2006.01)
*G08B 13/18* (2006.01)

(52) U.S. Cl.
CPC ..................................... *H04N 5/33* (2013.01)

(58) Field of Classification Search
CPC ............... H04N 5/33; H04N 3/09; G01J 5/02; G01J 2005/0077; G01S 7/4802; G06K 9/3241
See application file for complete search history.

(56) References Cited

U.S. PATENT DOCUMENTS 6,404,397 B1 * 6/2002 Grinberg et al. .............. 343/753

* cited by examiner

*Primary Examiner* — Dave Czekaj
*Assistant Examiner* — Tsion B Owens
(74) *Attorney, Agent, or Firm* — Christopher L. Blackburn

(57) ABSTRACT

Systems, methods, and articles of manufacture for determining a ranges from sensor pixels to corresponding scene points.

6 Claims, 2 Drawing Sheets

| 4 | 1 | 2 | 3 | 8 | 5 |
|---|---|---|---|---|---|
| 3 | 9 | 6 | 1 | 23 | 5 |
| 8 | 3 | 5 | 7 | 2 | 1 |
| 4 | 6 | 9 | 5 | 2 | 3 |
| 2 | 1 | 5 | 8 | 6 | 4 |
| 3 | 2 | 1 | 7 | 5 | 7 |

FIGURE 1

| 1 | 5 | 9 | 3 | 2 | 0 |
|---|---|---|---|---|---|
| 8 | 5 | 2 | 5 | 7 | 3 |
| 2 | 5 | 9 | 3 | 1 | 4 |
| 5 | 2 | 7 | 1 | 9 | 6 |
| 2 | 8 | 5 | 3 | 6 | 9 |
| 8 | 9 | 4 | 6 | 7 | 2 |

FIGURE 2

TWO SOURCE ACTIVE SENSOR SYSTEM FOR THREE-DIMENSIONAL VISION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments generally related to electronic vision systems and methods.

BRIEF DESCRIPTION OF THE DRAWINGS

FIG. 1 illustrates a 6 by 6 illustrative focal plane array of an illustrative sensor having illustrative pixel intensity values generated in response to imaging a scene illuminated by a first electromagnetic energy source at a first time.

FIG. 2 illustrates a 6 by 6 illustrative focal plane array of the illustrative sensor used in FIG. 1 having illustrative pixel intensity values generated in response to imaging the scene imaged in FIG. 1 illuminated by a second electromagnetic energy source (not including the first electromagnetic energy source) at a second time.

Figure 3:
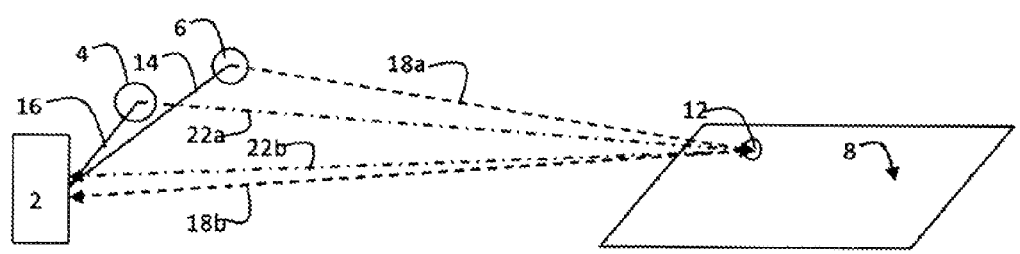
FIG. 3 provides an exemplary diagram of a sensor, two electromagnetic energy sources, a scene, electromagnetic energy transmitted from the two electromagnetic energy sources and reflected by said scene.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

At the outset, it is perhaps helpful to describe conventions and input. Embodiments of the invention employ at least one image sensor. An image sensor is a device that converts an optical image into an electronic signal. It is used mostly in digital sensors, sensor modules and other imaging devices. Early analog sensors were video sensor tubes; most currently used are digital charge-coupled device (CCD) or complementary metal-oxide-semiconductor (CMOS) active pixel sensors. The generated electronic signals (multiple values) each correspond to a pixel (a single scalar element of a multi-component representation aka photosite or sensel) intensity value, where intensity is taken to be energy/(time*length^2). A focal plane array arrangement is used to illustrate embodiments; however, any other known imaging device capable of measuring the energy scattered by an image scene.

In some embodiments, the intensity value of each pixel of the image generated by the image sensor is converted to digital format using any conventional technique, resulting in a digital image, where a digital image is a numeric representation (normally binary) of a two-dimensional image. Depending on whether the image resolution is fixed, it may be of vector or raster type. Without qualifications, the term "digital image" usually refers to raster images also called bitmap images.

Raster images have a finite set of digital values, called picture elements or pixels. The digital image contains a fixed number of rows and columns of pixels. Pixels are the smallest individual element in an image, holding quantized values that represent the brightness of a given color at any specific point. Typically, the pixels are stored in computer memory as a raster image or raster map, a two-dimensional array of small integers. These values are often transmitted or stored in a compressed form. Raster images can be created by a variety of input devices and techniques, such as digital sensors, scanners, coordinate-measuring machines, seismographic profiling, airborne radar, and more. They can also be synthesized from arbitrary non-image data, such as mathematical functions or three-dimensional geometric models; the latter being a major sub-area of computer graphics. The field of digital image processing is the study of algorithms for their transformation.

The technology relates to an active sensor or video system with two sources of scene illumination (two electromagnetic energy sources) that obtains the 3D surface of the scene imaged by the sensor system. The sensor system intensity images are processed to determine the 3D location of each pixel thereby obtaining the 3D knowledge of the surface of the imaged scene. This 3D information is valuable for (1.) navigation, including vehicle landing, docking, and parking, (2.) robotics in the finding of attachment to, and manipulation of objects, and (3.) targeting by weapon tracking, guidance and interception of targets. This technology provides a unique solution for the collection of imaging data and processing to provide 3D vision (3DVISION), the 3D shape and location of the scene imaged. LADAR sensors are another solution for three-dimensional imaging, but LADAR focal plane arrays are composed of pixels that are timing elements and typically these focal plane arrays have few pixels when compared to intensity measuring sensors, where multi-mega pixels is typical. These mega pixel focal plane arrays allow for the imaging of an entire frame of data in a very short period of time. This reduces the distortions that result when the sensor and/or the scene is moving and allows for tighter feedback and control that might be required in some application such as a robotics system or a vehicle landing system. The hardware for this technology is easy to obtain and this technology provides results that are more suitable in some contexts.

With reference to FIG. 3, methods employ: 1) a sensor (or 'sensor') 2; 2) two electromagnetic energy sources 4, 6 offset from each other and positioned such that the electromagnetic energy they transmit illuminates scene 8; and 3) an electronic processor to calculate/transform the intensity data collected by the sensor 2 into range or distance from the sensor 2 to the different pixels of the scene.

In general, first, the scene is illuminated by a first of the electromagnetic energy sources and an intensity image is collected by the sensor. Next, the scene is illuminated by the other electromagnetic energy source and a second intensity image is collected by the sensor. Last, the pixel data of the intensity images together with the positions of the sensor and the electromagnetic energy sources are processed to result in the 3D location in space of the surface of the scene for each pixel.

Figure 4:
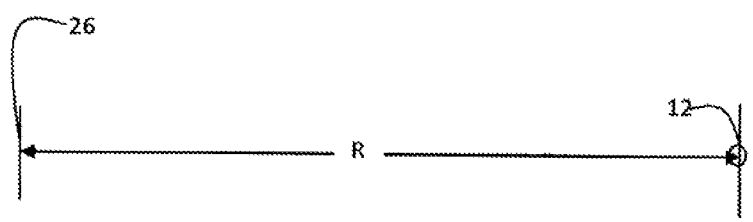
FIG. 4 provides an illustration of the range from at least one sensor pixel to a corresponding point in the scene illustrated in FIG. 3.

More particularly, referring to FIG. 3, sensor 2 is positioned to image the Scene 8. First illumination source 4 is positioned with a distance separation from second illumination source 6. With reference to FIG. 4, the distance from sensor 2 to scene 8 for each pixel is (R). With reference to FIG. 4, the distance from the sensor to first electromagnetic energy source is indicated by line 16 and is notationally referred to herein as $R_{c1}$ is and the distance from the sensor to second electromagnetic energy source is indicated by line 14 and is notationally referred to herein as $R_{c2}$. Of course other sensor and electromagnetic energy source positions can be used so long as each of the electromagnetic energy sources individually sufficiently illuminates the scene to collect an image of the scene at the sensor when each of the electromagnetic energy sources individually illuminates the scene.

Sensor 2 detects two intensities for each focal plane array pixel, one intensity is a measurement of energy coming only from the from first electromagnetic energy source 4 and reflected from scene 8 (this intensity notationally referred to herein as $I_{1d}$) and the other intensity is a measurement of energy coming only from second electromagnetic energy source 6 and reflected from scene 8 (this intensity notationally referred to herein as $I_{2d}$). The illumination of scene 8 by the two electromagnetic energy sources are separated in time such that the same detection element in the sensor's focal plane array can be used twice, once to collect energy from first electromagnetic energy source 4 and once to collect energy from second electromagnetic energy source 6.

Images are collected at the first point in time and second point in time. FIGS. 1 and 2 illustrate 6 by 6 illustrative focal plane array intensity values collected images of an illustrative sensor 2 having illustrative pixel intensity values generated in response to imaging an illustrative scene 8 illuminated by first electromagnetic energy source 4 (FIG. 1) at a first time and second electromagnetic energy source 6 (FIG. 2) at a second time. The distances $R_{c1}$ 16 and $R_{c2}$ 14 from the sensor 2 to the first and second electromagnetic energy sources 4, 6 and the intensities ($I_{1d}$) and ($I_{2d}$) measured by the Sensor for each of the Electromagnetic energy Sources for each pixel now are used to calculate the distance (R) from the Sensor to each pixel in the Scene as follows:

The intensity ($I_{1d}$) is the intensity measured by the sensor 2 of the energy that is only emitted from first electromagnetic energy source 4. This energy illuminates the scene 8, reflects from the scene 8 and is detected by sensor 2. This intensity is measured for each sensor pixel. The units for intensity are energy 1 (time·length$^2$). For a typical sensor, energy is the pixel value, time is the shutter speed and length$^2$ is the area of the aperture.

The intensity ($I_{2d}$) is the intensity measured by sensor 2 of the energy that is only emitted from second electromagnetic energy Source 16. This energy illuminates the scene 8, reflects from the scene 8 and is detected by the sensor 2. This intensity is measured for each sensor pixel.

The distance ($R_{c1}$) 16 is the distance from sensor 2 to first electromagnetic energy source 4.

The distance ($R_{c2}$) 14 is the distance from the Sensor to second electromagnetic energy Source 6.

$$Q = \sqrt{\frac{I_{1d}}{I_{2d}}}.$$

With reference to FIG. 4, the distance (R) is the distance from a sensor pixel 26 to its corresponding point 12 in scene and is calculated for each pixel according to the following mathematical relation:

$$R = \frac{R_{ch} - QR_{cg}}{(1 - Q)}.$$

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of determining range from a sensor to a scene, comprising:
    transmitting electromagnetic energy from a first electromagnetic energy source at a first time;
    collecting a first intensity image at a sensor having at least one pixel by receiving, at said sensor, first reflected electromagnetic energy, wherein said first reflected electromagnetic energy is transmitted electromagnetic energy from said first electromagnetic energy source that is scattered by a scene and received at said sensor; wherein said first electromagnetic energy source illuminates said scene; wherein each of said at least one pixel correspond to a point in said scene;
    transmitting electromagnetic energy from a second electromagnetic energy source at a second time;
    collecting a second intensity image at said sensor by receiving, at said sensor, second reflected electromagnetic energy, wherein said second reflected electromagnetic energy is transmitted electromagnetic energy from said second electromagnetic energy source that is scattered by said scene and received at said sensor; wherein said second electromagnetic energy source illuminates said scene;
    electronically computing a distance from said at least one pixel to its corresponding point in said scene by computing the following, where $R_{c1}$=the distance from said sensor to said first electromagnetic energy source at said first point in time; $R_{c2}$=the distance from said sensor to said second electromagnetic energy source at said second point in time; $I_{1d}$=the intensity of said at least one pixel in response to said first reflected electromagnetic energy; $I_{2d}$=the intensity of said at least one pixel in response to said second reflected electromagnetic energy; and $$Q = \sqrt{\frac{I_{1d}}{I_{2d}}} \; ; R = \frac{R_{c2} - QR_{c1}}{(1 - Q)}.$$

2. The method of claim 1, wherein said sensor is a camera.

3. The method of claim 2, wherein said camera is a focal plane array camera.

4. The method of claim 3, wherein said electromagnetic energy is visible light.

5. The method of claim 1, wherein said electromagnetic energy is infrared energy.

6. The method of claim 5, wherein said detector is an infrared detector.

* * * * *